US008526414B2

(12) United States Patent
Lee et al.

(10) Patent No.: US 8,526,414 B2
(45) Date of Patent: *Sep. 3, 2013

(54) METHOD FOR PHYSICAL CONTROL FORMAT INDICATOR CHANNEL MAPPING

(75) Inventors: Jung Hoon Lee, Anyang-si (KR); Joon Kui Ahn, Anyang-si (KR)

(73) Assignee: LG Electronics Inc., Seoul (KR)

( * ) Notice: Subject to any disclaimer, the term of this patent is extended or adjusted under 35 U.S.C. 154(b) by 403 days.

This patent is subject to a terminal disclaimer.

(21) Appl. No.: 12/960,339

(22) Filed: Dec. 3, 2010

(65) Prior Publication Data

US 2011/0075626 A1      Mar. 31, 2011

Related U.S. Application Data

(63) Continuation of application No. 12/331,464, filed on Dec. 10, 2008, now Pat. No. 7,869,415.

(60) Provisional application No. 61/013,281, filed on Dec. 12, 2007.

(30) Foreign Application Priority Data

Sep. 2, 2008   (KR) .................. 10-2008-0086368

(51) Int. Cl.
*H04B 7/208*      (2006.01)
(52) U.S. Cl.
USPC .......................... 370/344; 370/480; 455/423
(58) Field of Classification Search
USPC ................................. 370/344, 380; 455/423
See application file for complete search history.

(56) References Cited

U.S. PATENT DOCUMENTS

| 6,300,864 B1 | 10/2001 | Willey |
| 6,385,457 B1 | 5/2002 | Dam et al. |
| 2003/0036403 A1 | 2/2003 | Shiu et al. |
| 2005/0020260 A1 | 1/2005 | Jeong et al. |
| 2005/0120097 A1 | 6/2005 | Walton et al. |
| 2007/0206559 A1* | 9/2007 | Cho et al. ...................... 370/344 |
| 2009/0147743 A1* | 6/2009 | Parkvall et al. ............... 370/329 |

FOREIGN PATENT DOCUMENTS

| CN | 1568587 A | 1/2005 |
| EP | 1819118 A2 | 8/2007 |
| JP | 2010-541319 A | 12/2010 |
| RU | 2251797 | 5/2005 |
| WO | WO 2009/041879 A1 | 4/2009 |

OTHER PUBLICATIONS

3GPP TSG RAN WG1 #51 (IDS), Nov. 5-9, 2007.*

(Continued)

*Primary Examiner* — Yemane Mesfin
*Assistant Examiner* — Wanda Z Russell
(74) *Attorney, Agent, or Firm* — McKenna Long & Aldridge LLP (57) ABSTRACT

A method of mapping symbols of a physical control format indicator channel (PCFICH) is described. A start position of a resource element to map the symbols for the PCFICH is determined by flooring a value, obtained by multiplying the number of resource blocks by a variable proportional to a symbol index for the PCFICH and then dividing the multiplied result by 2, wherein the resource blocks are transmitted in downlink. The symbols are mapped in the start position. Therefore, a problem of wasting resource elements or not being able to implement mapping can be solved by applying a simple mapping rule while mapping symbols of the PCFICH.

8 Claims, 7 Drawing Sheets

(56) References Cited

OTHER PUBLICATIONS

Samsung: "CCFI to RE mapping for multiple TX antennas", 3GPP TSG RAN WG1 Meeting #51, Jeju, Korea, Nov. 5-9, 2007, R1-074770.

Dorot et al. "Symbol is an element of a sign set allowable of a computing system, which can be coded, input into a computer and displayed on a display screen. Symbols are letters, numerals and etc.", Explanatory Dictionary of Modern computer Lexis, Saint-Petersburg, BHV-Petersburg, 2004, pp. 433-L1.

A.B. Borkovsky, "Mapping is representation, matching; conversion" English-Russian Dictionary of Programming and Informatics, Moscow International School of Translators, 1992, pp. 161-L2.

Nokia et al. "Control Channel to RE Mapping", 3GPP TSG RAN WG1 Meeting #50bis, Shanghai, China, R1-074318 Dec. 10, 2007.

3GPP TSG RAN WG1 Meeting #51, (Nov. 9, 2007), Samsung PHICH/PDCCH to RE mapping, R1-074773.

3GPP TSG RAN WG1 Meeting #51, (Nov. 9, 2007), Samsung PCFICH Mapping for One Transmitter Antenna, R1-074769.

Samsung: "PHICH/PDCCH to RE mapping", 3GPP TSG RAN WG1 Meeting #51, Jeju, Korea, Nov. 5-9, 2007, R1-074773, XP50108242.

LG Electronics: "Correction on the PCFICH to RE mapping", 3GPP TSG RAN WG1 #51bis, Sevilla, Spain, Jan. 14-18, 2008, R1-080369, XP50108888.

Samsung: PCFICH Mapping for One Transmitter Antenna:, 3GPP TSG RAN WG1 Meeting #51, Jeju, Korea, Nov. 5-9, 2007, R1-074769, XP50108238.

3$^{rd}$ Generation Partnership Project: "Technical Specification Group Radio Access Network; Evolved Universal terrestrial Radio Access (E-UTRA); Physical Channels and Modulation (Release 8)", 3GPP TS 36.211, V8.1.0, Nov. 2008, XP050377533.

* cited by examiner

METHOD FOR PHYSICAL CONTROL FORMAT INDICATOR CHANNEL MAPPING

CROSS-REFERENCE TO RELATED APPLICATIONS

This application is a continuation of, and claims the benefit of, U.S. application Ser. No. 12/331,464, filed Dec. 10, 2008, now U.S. Pat. No. 7,869,415 and claims priority to U.S. Provisional Application No. 61/013,281, filed Dec. 12, 2007 and Korean Application No. 10-2008-0086368, filed in the Republic of Korea on Sep. 2, 2008, and each of the above-identified applications are incorporated by reference in their entirety as if fully set forth herein.

TECHNICAL FIELD

The present invention relates to a mapping method for frequency and orthogonal frequency division multiplexing (OFDM) symbol regions of a signal transmitted in downlink in a cellular OFDM wireless packet communication system, and more particularly, to a mapping method which is capable of solving a problem of wasting resource elements or not being able to implement mapping by applying a simple mapping rule while mapping symbols of a physical control format indicator channel (PCFICH).

BACKGROUND ART

When transmitting data through downlink of an OFDM wireless packet communication system, if each user equipment is informed of how many OFDM symbols are used to transmit a control channel, the user equipment has many advantages in using information of the control channel. Especially, a 3GPP LTE system defines a channel notifying the number of OFDM symbols used for the control channel as a physical control format indicator channel (PCFICH).

More specifically, in the 3GPP LTE system, the PCFICH is expressed as 2 bits indicating three states according to whether the number of OFDM symbols used to transmit the control channel is 1, 2, or 3. The 2 bits are increased to 32 bits through channel coding and then expressed as 16 quadrature phase shift keying (QPSK) symbols through QPSK modulation. The PCFICH is always transmitted only through the first OFDM symbol of a subframe and a mapping method in a frequency region for transmission is as follows.

$y(0), \ldots, y(3)$ are mapped to resource elements starting with a position of $k=k_0$, $y(4), \ldots, y(7)$ are mapped to resource elements starting with a position of $k=k_0+\lfloor N_{RB}^{DL} N_{sc}^{RB}/4 \rfloor$, $y(8), \ldots, y(11)$ are mapped to resource elements starting with a position of $k=k_0+\lfloor 2N_{RB}^{DL} N_{sc}^{RB}/4 \rfloor$, and $y(12), \ldots, y(15)$ are mapped to resource elements starting with a position of $k=k_0+\lfloor 3N_{RB}^{DL} N_{sc}^{RB}/4 \rfloor$. Here, a value $k_0$ for shifting a starting point is $k_0=(N_{sc}^{RB}/2) \cdot (N_{ID}^{cell} \mod 2N_{RB}^{DL})$.

The above additions include a modular operation of $N_{RB}^{DL} N_{sc}^{RB}$, and $N_{ID}^{cell}$ denotes a physical layer cell identification (ID).

In the above mapping rule, $y(0), \ldots, y(15)$ denote 16 QPSK symbols, $N_{RB}^{DL}$ denotes the number of resource blocks transmitted in downlink, and $N_{sc}^{RB}$ denotes the number of resource elements per resource block. $k_0$ is determined according to the cell ID $N_{ID}^{cell}$ which varies with each cell. Starting with $k_0$, the symbols are dispersed in four frequency regions comprised of 4 adjacent resource elements which are not used for transmission of a reference signal (RS) to obtain a frequency diversity gain over all downlink frequency bands, and then transmitted. The reason why the 4 adjacent resource elements which are not used for transmission of the reference signal are used is that since other control channels are constructed with a resource element group (REG) comprised of 4 adjacent resource elements which are not used for transmission of the REFERENCE SIGNAL, multiplexing of a PCFICH with other control channels can be efficiently performed using the same mapping method.

However, when mapping symbols for the PCFICH according to the above-described mapping method, there may be the following disadvantages.

First, if and $N_{sc}^{RB}$ is 12 in a general subframe structure of a 3GPP LTE system, the second and fourth frequency regions among 4 frequency regions are mapped over 2 REGs when $N_{RB}^{DL}$ is an odd number.

Figure 1:
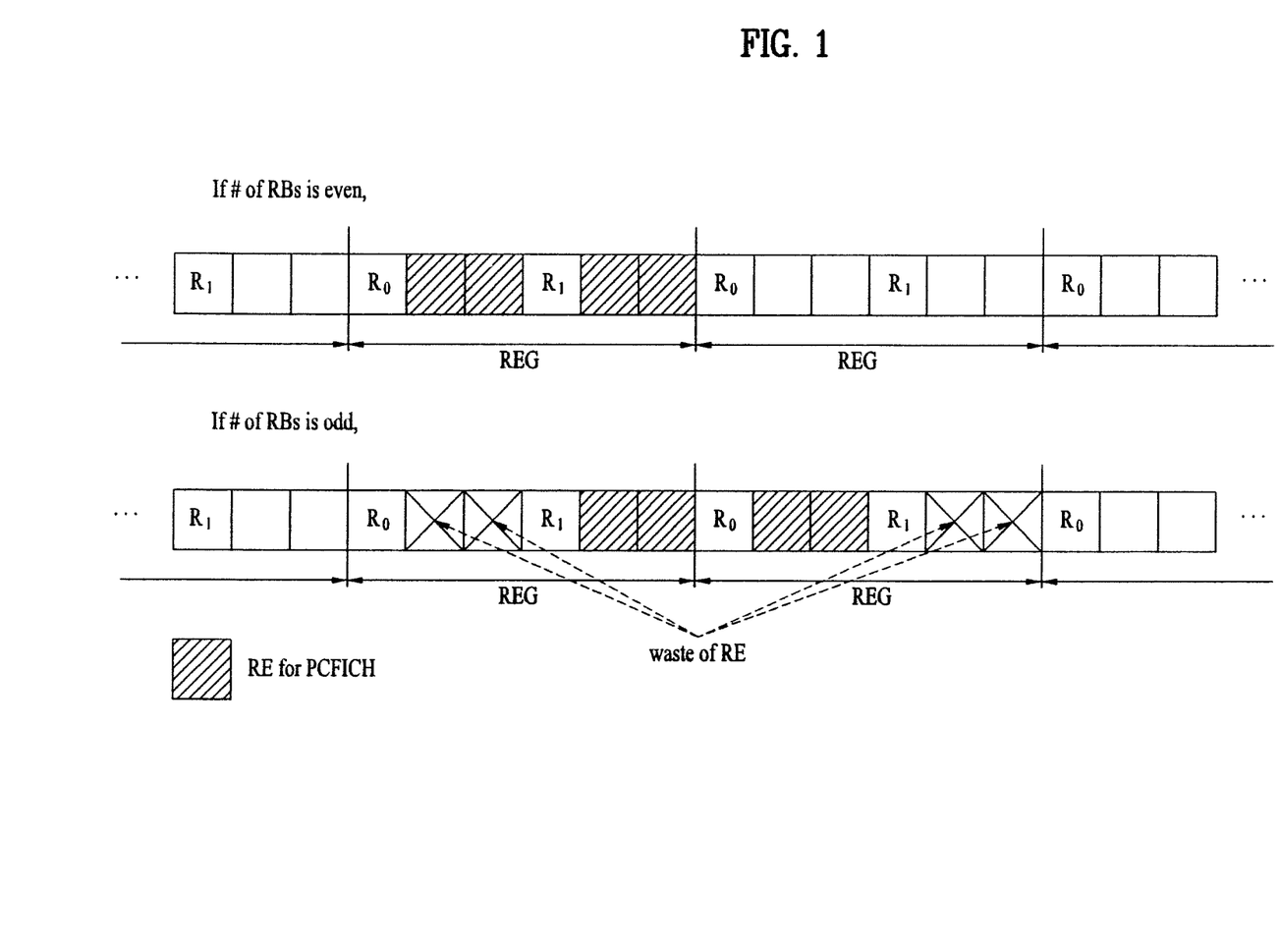
FIG. 1 illustrates a conventional mapping method in which 4 symbols are mapped to 2 REGs.

FIG. 1 illustrates a conventional mapping method in which 4 symbols are mapped to 2 REGs.

As illustrated in FIG. 1, if $N_{RB}^{DL}$ is an even number, 4 frequency regions for transmission of a PCFICH are identical to units of an REG for transmission of other control channels. However, if $N_{RB}^{DL}$ is an odd number, the second and fourth frequency regions are mapped over 2 REGs. In this case, since an REG is comprised of 4 adjacent resource elements which are not used for transmission of a reference signal, resource elements remaining at both sides of the 4 adjacent resource elements can not be used for transmission of a control channel, thereby wasting resources.

Second, the above-described mapping rule has a region in which mapping can not be implemented.

A frequency mapping region varies with $N_{ID}^{cell}$ ID which is unique for each cell. Hence, cells having adjacent cell IDs may reduce interference caused by transmission of a PCFICH. This $N_{ID}^{cell}$ is comprised of 504 values ranging from 0 to 503 according to a current 3GPP LTE standard. When $N_{RB}^{DL}$ is an odd number, a region in which frequency mapping for PCFICH transmission can not be performed occurs according to $N_{ID}^{cell}$.

Figure 2:
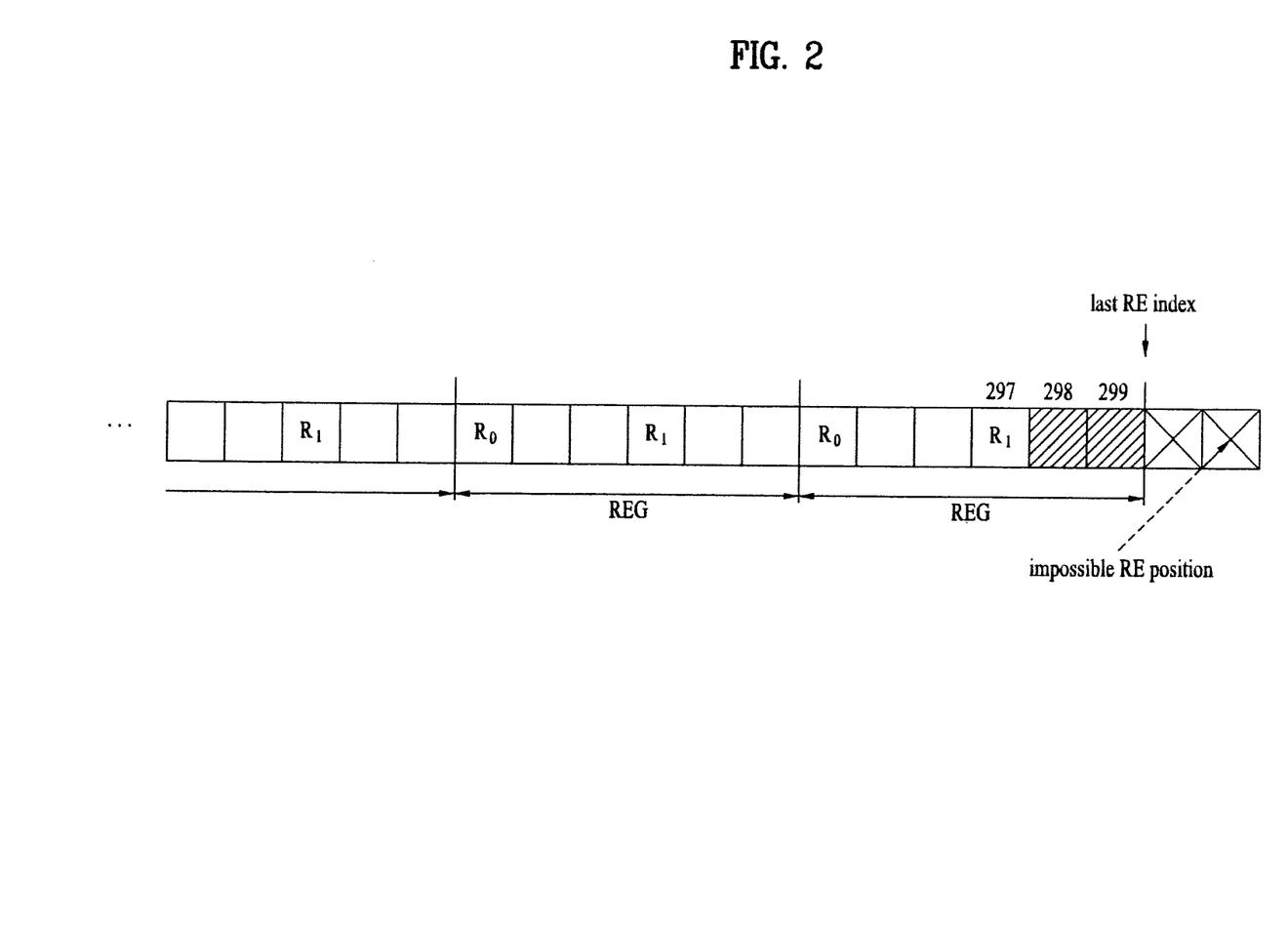
FIG. 2 illustrates the case where mapping can not be implemented in a conventional mapping method.

FIG. 2 illustrates the case where a region in which mapping can not be implemented occurs in a frequency region for PCFICH transmission according to $N_{ID}^{cell}$. For example, if $N_{RB}^{DL}$ is 25, $N_{ID}^{cell}$ is 12, and $N_{sc}^{RB}$ is 12, a frequency region allocated to 4 successive resource elements deviates from a frequency region in which a PCFICH should actually be transmitted. In this case, the PCFICH can not be allocated to a corresponding region.

DISCLOSURE

Technical Problem

An object of the present invention devised to solve the problem lies in providing a method which can solve a problem of wasting resource elements or having difficulty in mapping while mapping symbols for a PCFICH.

Technical Solution

The object of the present invention can be achieved by providing a method of mapping symbols of a PCFICH in units of a resource element group. If the number of resource blocks transmitted in downlink is an even number, a conventional mapping method is used. If the number of resource blocks is an odd number, the method of mapping symbols of a PCFICH is used including determining a start position of a resource element to map the symbols for the PCFICH using a variable obtained by subtracting 1 from the number of resource blocks, and mapping the symbols in the start position.

The determining may include determining an initial start position according to a physical layer cell ID.

The mapping may include mapping symbols of a first group among four groups to resource elements starting with a position of k=k_0, mapping symbols of a second group among the four groups to resource elements starting with a position of $k=k_0+\lfloor(N_{RB}^{DL}-1)N_{sc}^{RB}/4\rfloor$, mapping symbols of a third group among the four groups to resource elements starting with a position of $k=k_0+\lfloor 2(N_{RB}^{DL}-1)N_{sc}^{RB}/4\rfloor$, and mapping symbols of a fourth group among the four groups to resource elements starting with a position of $k=k_0+\lfloor 3(N_{RB}^{DL}-1)N_{sc}^{RB}/4\rfloor$.

The mapping may include mapping symbols in positions except for resource elements of reference signals in a first OFDM symbol.

In another aspect of the present invention, provided herein is a method of mapping symbols of a PCFICH, including determining a start position of a resource element to map the symbols for the PCFICH by flooring a value, obtained by multiplying the number of resource blocks by a variable proportional to a symbol index for the PCFICH and then dividing the multiplied result by 2, wherein the resource blocks are transmitted in downlink, and mapping the symbols in the start position.

The determining may include determining an initial start position according to a physical layer cell ID.

The mapping may include mapping symbols of a first group among four groups to resource elements starting with a position of k=k_0, mapping symbols of a second group among the four groups to resource elements starting with a position of $k=k_0+\lfloor N_{RB}^{DL}/2\rfloor \cdot N_{sc}^{RB}/2$; mapping symbols of a third group among the four groups to resource elements starting with a position of $k=k_0+\lfloor 2N_{RB}^{DL}/2\rfloor \cdot N_{sc}^{RB}/2$, and mapping symbols of a fourth group among the four groups to resource elements starting with a position of $k=k_0+\lfloor 3N_{RB}^{DL}/2\rfloor \cdot N_{sc}^{RB}/2$.

The mapping may include mapping symbols of a first group among four groups to resource elements starting with a position of k=k_0, mapping symbols of a second group among the four groups to resource elements starting with a position of $k=k_0\lfloor N_{RB}^{DL}/2\rfloor \cdot N_{sc}^{RB}/2$, mapping symbols of a third group among the four groups to resource elements starting with a position of $k=k_0+2\lfloor N_{RB}^{DL}/2\rfloor \cdot N_{sc}^{RB}/2$, and mapping symbols of a fourth group among the four groups to resource elements starting with a position of $k=k_0+3\lfloor N_{RB}^{DL}/2\rfloor \cdot N_{sc}^{RB}/2$.

The mapping may include mapping symbols in positions except for resource elements of reference signals in a first OFDM symbol.

Advantageous Effects

In accordance with the exemplary embodiments of the present invention, a problem of wasting resource elements or not being able to implement mapping can be solved by applying a simple mapping rule while mapping symbols of a PCFICH.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention with reference to the accompanying drawings. The detailed description is intended to explain exemplary embodiments of the present invention, rather than to show the only embodiments that can be implemented according to the invention.

In an exemplary embodiment of the present invention, a method applying different mapping rules according to $N_{RB}^{DL}$ is proposed.

In a conventional mapping method, the above-described problems do not occur for $N_{RB}^{DL}$ of an even number, so the conventional mapping method is used for $N_{RB}^{DL}$ of an even number and the following mapping method is used for $N_{RB}^{DL}$ of an odd number.

Hereinbelow, $y(0), \ldots, y(15)$ denotes 16 QPSK symbols, $N_{RB}^{DL}$ denotes the number of resource blocks transmitted in downlink, and $N_{sc}^{RB}$ denotes the number of resource elements per resource block.

According to an exemplary embodiment of the present invention, if $N_{RB}^{DL}$ is an odd number, $y(0), \ldots, y(3)$ are mapped to resource elements starting with a position of k=k_0, $y(4), \ldots, y(7)$ are mapped to resource elements starting with a position of $k=k_0+\lfloor(N_{RB}^{DL}-1)N_{sc}^{RB}/4\rfloor$, $y(8), \ldots, y(11)$ are mapped to resource elements starting with a position of $k=k_0+\lfloor 2N_{RB}^{DL}N_{sc}^{RB}/4\rfloor$ or $k=k_0+\lfloor 2(N_{RB}^{DL}-1)N_{sc}^{RB}/4\rfloor$, and $y(12), \ldots, y(15)$ are mapped to resource elements starting with a position of $k=k_0+\lfloor 3(N_{RB}^{DL}-1)N_{sc}^{RB}/4\rfloor$.

Figure 3:
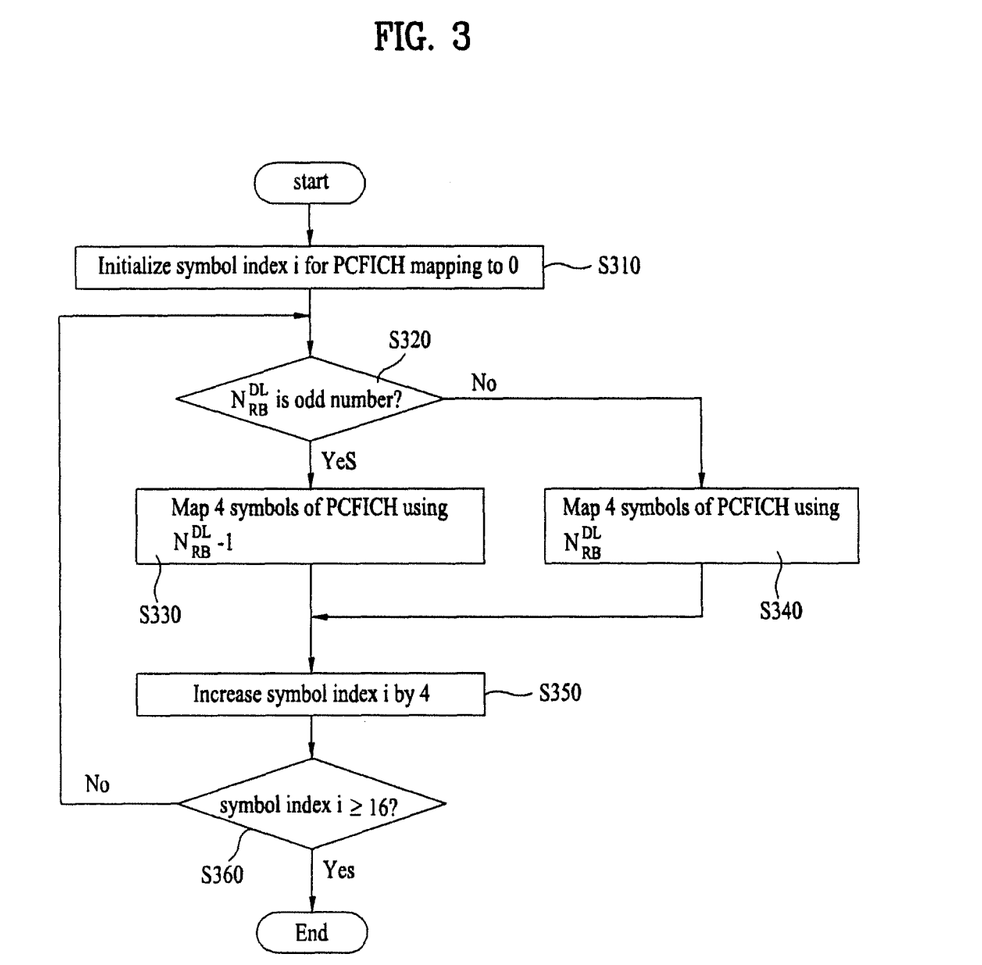
FIG. 3 is a flow chart illustrating a PCFICH mapping method according to an exemplary embodiment of the present invention; mapping method.

FIG. 3 is a flow chart illustrating a PCFICH mapping method according to an exemplary embodiment of the present invention.

A symbol index i for PCFICH mapping is initialized to 0 (step S310).

Next, a determination is made as to whether $N_{RB}^{DL}$ is an odd number (step S320). If $N_{RB}^{DL}$ is an odd number, positions of resource elements to map 4 symbols of a PCFICH are determined using $N_{RB}^{DL}-1$ and the 4 symbols are mapped to corresponding positions (step S330).

If $N_{RB}^{DL}$ is an even number, positions of resource elements to map 4 symbols of a PCFICH are determined using $N_{RB}^{DL}$ and the 4 symbols are mapped to corresponding positions (step S340).

If mapping is completed, the symbol index i is increased by 4 (step S350).

If the symbol index i is less than 16 (step S360), the above operations (steps S320 to S350) are repeated since symbols to be mapped remain.

Finally, if the symbol index i is equal to or greater than 16 (S360), a procedure is ended.

Meanwhile, another exemplary embodiment of the present invention proposes a single mapping method irrespective of whether $N_{RB}^{DL}$ is an odd number or an even number.

That is, the following mapping rule using a single expression regardless of $N_{RB}^{DL}$ can solve the conventional problems in mapping symbols for a PCFICH.

According to another exemplary embodiment of the present invention, $y(0), \ldots, y(3)$ are mapped to resource elements starting with a position of $k=k_0$, $y(4), \ldots, y(7)$ are mapped to resource elements starting with a position of $k=k_0+\lfloor N_{RB}^{DL}/2\rfloor \cdot N_{sc}^{RB}/2$, $y(8), \ldots, y(11)$ are mapped to resource elements starting with a position of $k=k_0+\lfloor 2N_{RB}^{DL}/2\rfloor \cdot N_{sc}^{RB}/2$, and $y(12), \ldots, y(15)$ are mapped to resource elements starting with a position of $k=k_0+\lfloor 3N_{RB}^{DL}/2\rfloor \cdot N_{sc}^{RB}/2$.

In the above method, $k_0$ is determined according to $N_{ID}^{cell}$. If an index indicated by $k_0$ collides with an index of a resource element using a reference signal, $k_0$ may use an index increased by '1'.

Figure 4:
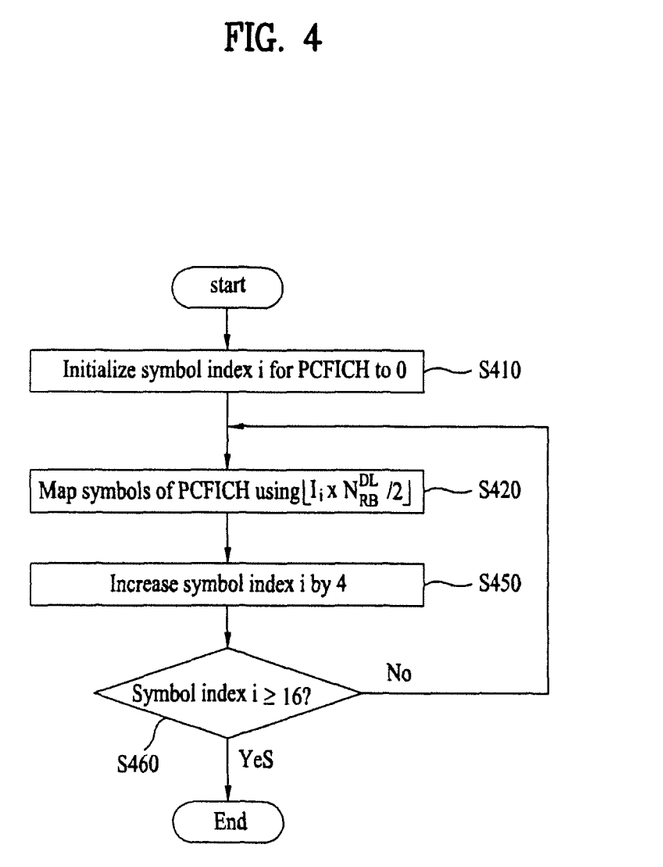
FIG. 4 is a flow chart illustrating a PCFICH mapping method according to another exemplary embodiment of the present invention; mapping method.

FIG. 4 is a flow chart illustrating a PCFICH mapping method according to another exemplary embodiment of the present invention.

First, a symbol index i for PCFICH mapping is initialized to 0 (step S410).

A start position of a resource element for PCFICH mapping is determined by flooring a value obtained by multiplying a variable $I_i$ proportional to the symbol index by $N_{RB}^{DL}$ and then dividing the multiplied result by 2 (step S420). The variable may be, for example, $I_0=0$, $I_4=1$, $I_8=2$, and $I_{12}=3$.

If mapping is completed, the symbol index i is increased by 4 (step S450).

If the symbol index i is less than 16 (step S460), the above operations (steps S420 to S450) are repeated since symbols to be mapped remain.

Finally, if the symbol index i is equal to or greater than 16 (S460), a procedure is ended.

The above mapping rule according to another exemplary embodiment of the present invention may be modified as follows.

Namely, $y(0), \ldots, y(3)$ are mapped to resource elements starting with a position of $k=k_0$, $y(4), \ldots, y(7)$ are mapped to resource elements starting with a position of $k=k_0+3\lfloor N_{RB}^{DL}/2\rfloor \cdot N_{sc}^{RB}/2$, $y(8), \ldots, y(11)$ are mapped to resource elements starting with a position of $k=k_0+2\lfloor N_{RB}^{DL}/2\rfloor \cdot N_{sc}^{RB}/2$, and $(12), \ldots, y(15)$ are mapped to resource elements starting with a position of $k=k_0+3\lfloor N_{RB}^{DL}/2\rfloor \cdot N_{sc}^{RB}/2$.

Figure 5:
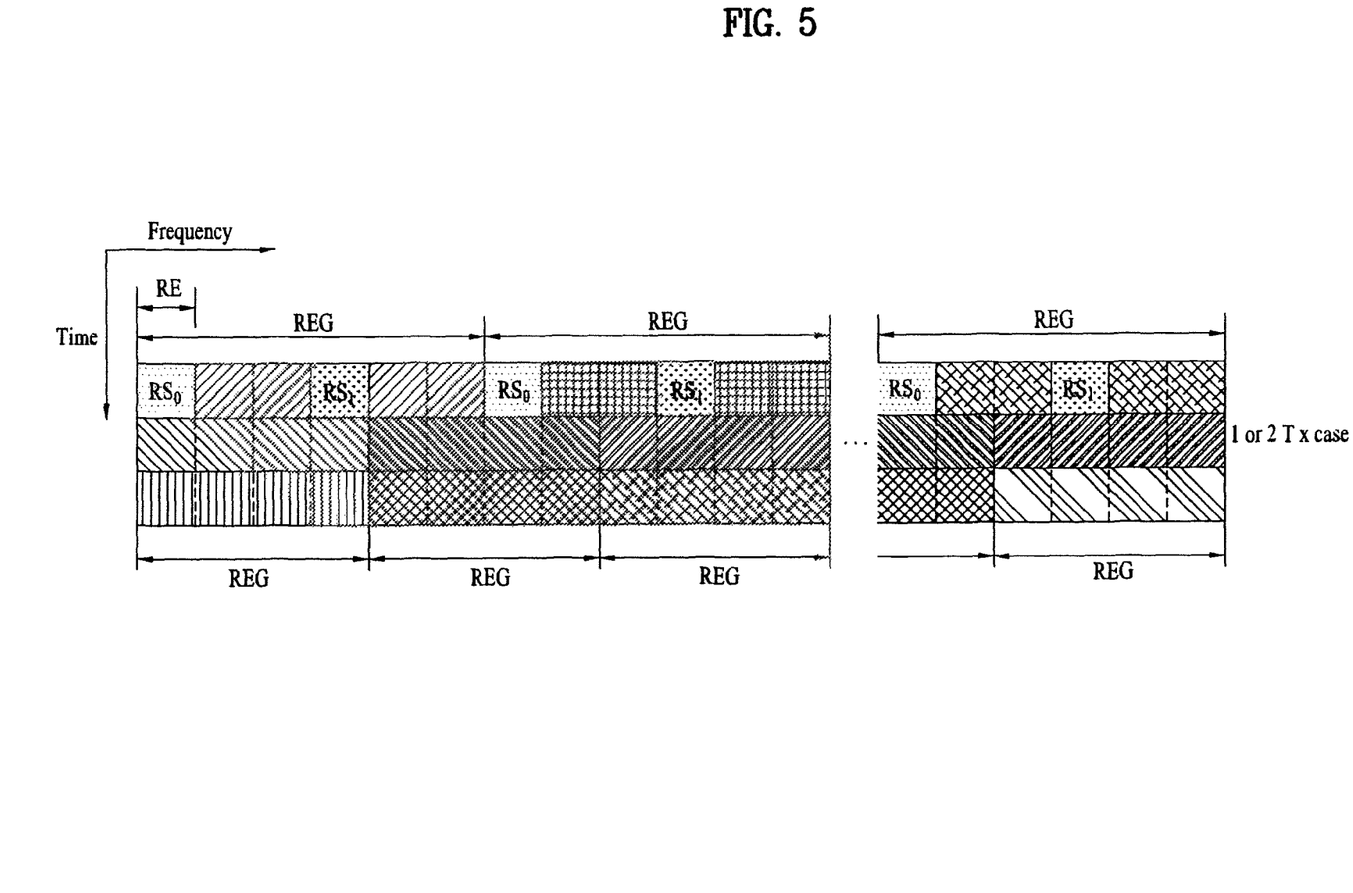
FIG. 5 illustrates an example of REGs when 2 or less transmit antennas are used; mapping method.

FIG. 5 illustrates an example of REGs when two or less transmit antennas are used.

In the first OFDM symbol (first line) through which a PCFICH is transmitted, since reference signals of respective antennas are transmitted, one REG is comprised of 6 resource elements. Since no reference signal exists in the second OFDM symbol (second line) when using 2 or less transmit antennas, one REG is comprised of 4 resource elements.

Figure 6:
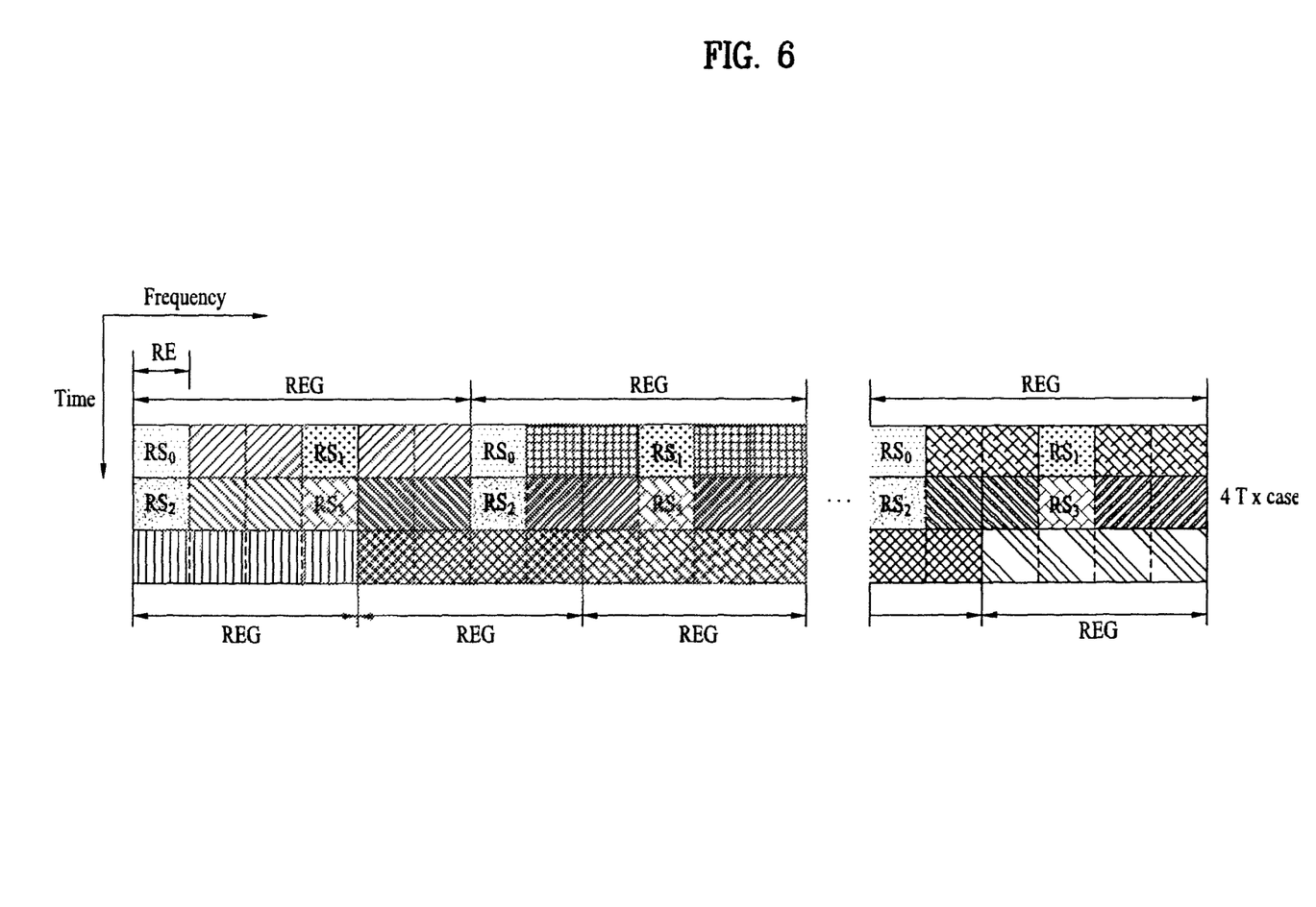
FIG. 6 illustrates an example of REGs when 4 transmit antennas are used; and mapping method.

FIG. 6 illustrates an example of REGs when 4 transmit antennas are used.

In the first OFDM symbol (first line) through which a PCFICH is transmitted, since reference signals of antennas are transmitted, one REG is comprised of 6 resource elements. When using 4 transmit antennas, since reference signals exist even in the second OFDM symbol (second line), one REG is comprised of 6 resource elements.

Figure 7:
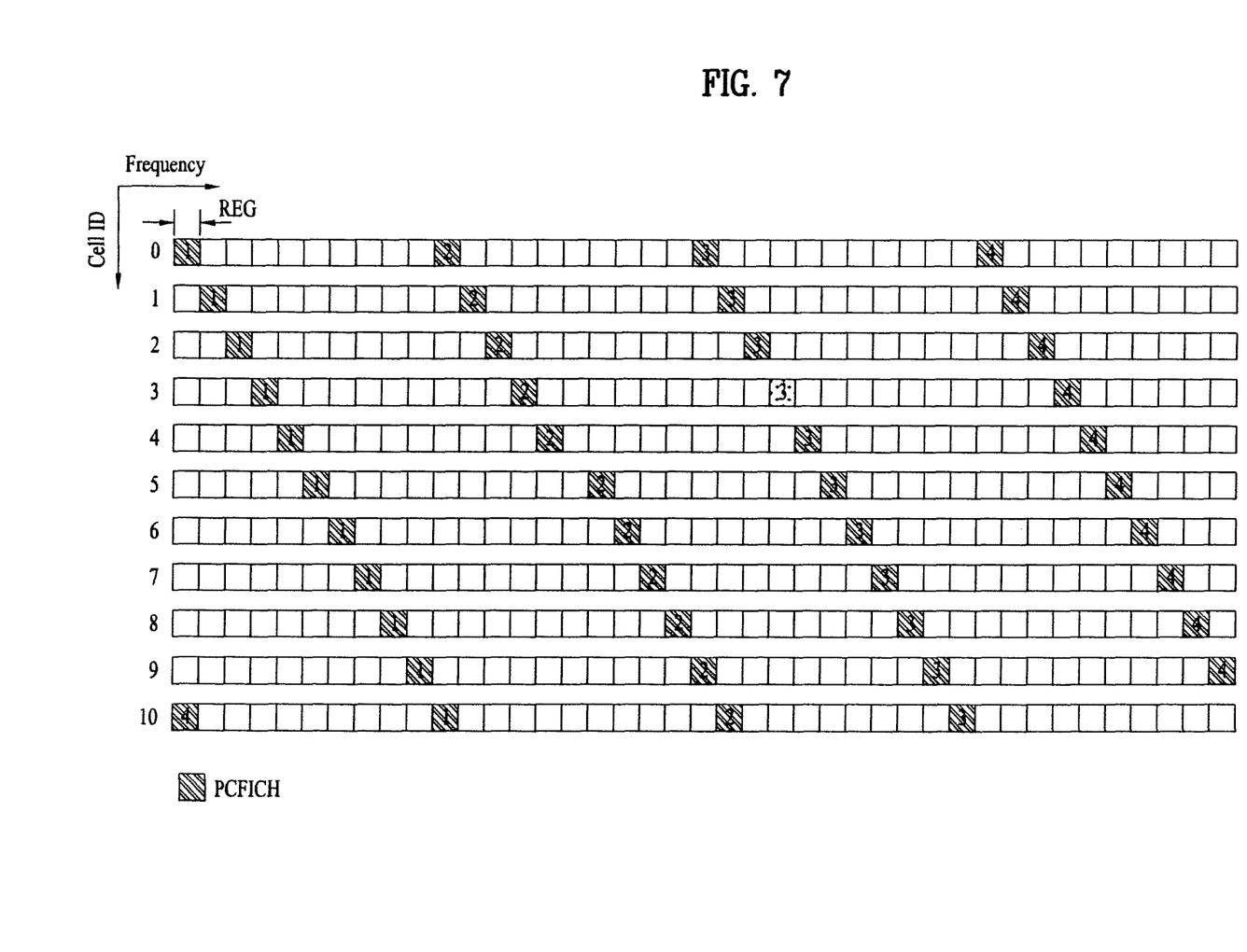
FIG. 7 illustrates an example of PCFICH mapping according to a cell ID.

FIG. 7 illustrates an example of PCFICH mapping according to a cell ID.

In FIG. 7, a system band corresponds to 20 resource blocks. Different start positions are set for 10 cell IDs. Positions denoted by "1" indicate positions of $k_0$ in the above-described mapping method. Accordingly, interference between cell IDs is reduced.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides a mapping method for frequency and OFDM symbol regions of a signal transmitted in downlink in a cellular OFDM wireless packet communication system and is applicable to a base station, a user equipment, etc. in a 3GPP LTE system.

The invention claimed is:

1. A method of transmitting physical control format indicator channel (PCFICH) symbols in a downlink subframe to a user equipment (UE), the method comprising:
    mapping 16 PCFICH symbols to four resource element groups (REGs) in a first OFDM symbol of the downlink subframe; and
    transmitting the mapped 16 PCFICH symbols,
    wherein the four resource element groups comprises a first resource element group including first four resource elements, a second resource element group including second four resource elements, a third resource element group including third four resource elements and a fourth resource element group including fourth four resource elements,
    wherein first resource elements from the first four resource elements, the second four resource elements, the third four resource elements and the fourth four resource elements have positions given by:
    $K_0$,
    $K_0+\lfloor N_{RB}^{DL}/2\rfloor * N_{SC}^{RB}/2$,
    $K_0+\lfloor 2N_{RB}^{DL}/2\rfloor * N_{SC}^{RB}/2$, and
    $K_0+\lfloor 3N_{RB}^{DL}/2\rfloor * N_{SC}^{RB}/2$, respectively,
    wherein $K_0$ is determined as $(N_{SC}^{RB}/2)*(N_{ID}^{cell} \mod 2N_{RB}^{DL})$,
    wherein '$N_{RB}^{DL}$' indicates a number of resource blocks transmitted in a downlink,
    wherein '$N_{SC}^{RB}$' indicates a number of resource elements per a resource block in the frequency domain, and
    wherein '$N_{ID}^{cell}$' is a physical layer cell identifier.

2. The method of claim 1, wherein the $N_{SC}^{RB}/2$ is 12.

3. The method of claim 1, further comprising:
    transmitting reference signals to the UE,
    wherein each of the first resource elements group, the second resource element group, the third resource element group and the four resource element group has 6 contiguous resource elements in the first OFDM symbol of the downlink subframe, and 2 of the 6 contiguous resource elements are used for the reference signals.

4. The method of claim 1, further comprising:
    channel coding 2 bits information of PCFICH to produce 32 bits information of the PCFICH; and
    modulating the 32 bits information of the PCFICH by a quadrature phase shift keying (QPSK) modulation to produce the 16 PCFICH symbols.

5. The method of claim 4, wherein the 2 bits information of the PCFICH notifies the UE of whether 1, 2 or 3 OFDM symbols in the downlink subframe are used for transmitting a control channel.

6. A method of receiving physical control format indicator channel (PCFICH) symbols in a downlink subframe by a user equipment (UE), the method comprising:

receiving 16 PCFICH symbols via a first OFDM symbol of the downlink subframe, wherein the 16 PCFICH symbols are mapped to four resource element groups (REGs), wherein the four resource element groups comprises a first resource element group including first four resource elements, a second resource element group including second four resource elements, a third resource element group including third four resource elements and a fourth resource element group including fourth four resource elements, wherein first resource elements from the first four resource elements, the second four resource elements, the third four resource elements and the fourth four resource elements have positions given by:

$K_0$,
$K_0 + \lfloor N_{RB}^{DL}/2 \rfloor * N_{SC}^{RB}/2$,
$K_0 + \lfloor 2N_{RB}^{DL}/2 \rfloor * N_{SC}^{RB}/2$, and
$K_0 + \lfloor 3N_{RB}^{DL}/2 \rfloor * N_{SC}^{RB}/2$, respectively wherein $K_0$ is determined as $(N_{SC}^{RB}/2) * (N_{ID}^{cell} \mod 2N_{RB}^{DL})$, wherein '$N_{RB}^{DL}$' indicates a number of resource blocks transmitted in a downlink, wherein '$N_{SC}^{RB}$' indicates a number of resource elements per a resource block in the frequency domain, and wherein '$N_{ID}^{cell}$' is a physical layer cell identifier; and acquiring information about a number of OFDM symbols used for a control channel based on the received 16 PCFICH symbols.

7. The method of claim 6, wherein the $N_{SC}^{RB}/2$ is 12.

8. The method of claim 6, further comprising:
receiving reference signals by the UE,
wherein each of the first resource elements group, the second resource element group, the third resource element group and the four resource element group has 6 contiguous resource elements in the first OFDM symbol of the downlink subframe, and 2 of the 6 contiguous resource elements are used for the reference signals.

* * * * *